(12) United States Patent
Vincent et al.

(10) Patent No.: US 6,398,461 B1
(45) Date of Patent: Jun. 4, 2002

(54) CONTAINER HANDLING SYSTEM

(75) Inventors: Patris E. Vincent, Madison; Brian E. Busse, Randolph, both of WI (US); George J. Congreve, Michigan City, IN (US)

(73) Assignee: Arrowhead Systems LLC, Randolph, WI (US)

( * ) Notice: Subject to any disclaimer, the term of this patent is extended or adjusted under 35 U.S.C. 154(b) by 0 days.

(21) Appl. No.: 09/509,630

(22) PCT Filed: Oct. 1, 1998

(86) PCT No.: PCT/US98/20568

§ 371 (c)(1),
(2), (4) Date: Jun. 15, 2000

(87) PCT Pub. No.: WO99/16690

PCT Pub. Date: Apr. 8, 1999

Related U.S. Application Data

(60) Provisional application No. 60/060,832, filed on Oct. 1, 1997.

(51) Int. Cl.[7] .............................................. B65G 51/03
(52) U.S. Cl. .............................. 406/79; 406/82; 406/88
(58) Field of Search ................................ 406/79, 82, 88

(56) References Cited

U.S. PATENT DOCUMENTS

| 3,685,632 A | 8/1972 | Brady |
|---|---|---|
| 4,730,956 A | 3/1988 | Lenhart |
| 4,834,605 A | 5/1989 | Jerred |
| 5,037,245 A | 8/1991 | Smith |
| 5,320,457 A | 6/1994 | VanderMeer et al. |

Primary Examiner—Joseph E. Valenza
Assistant Examiner—Jeffrey A Shapiro
(74) Attorney, Agent, or Firm—Michael Best & Friedrich LLP

(57) ABSTRACT

A container handling system (10) comprises a first belt conveyor (14), an air bed conveyor (16) adjacent the outlet (34) of the first belt conveyor (14), a second belt conveyor (18) adjacent the outlet 54 of the air bed conveyor (16), a pattern forming apparatus (110) including first and second partitions (114) defining therebetween a lane (118), a top cover (154) slidably positionable over the air bed conveyor (16) and over a portion of the pattern forming apparatus (110), and an alignment mechanism (170). The lane (118) has an inlet (138) positioned over the air bed conveyor (16) and an outlet (142) positioned over the second belt conveyor (18). The top cover (154) is movable along the direction of flow of containers (C) between covered and uncovered positions. The top cover includes a solid portion (158), and a perforated portion (162) allowing air to flow therethrough. The alignment mechanism (170) aligns the top cover (154) relative to the pattern forming apparatus (110) when the top cover (154) is in the covered position.

20 Claims, 8 Drawing Sheets

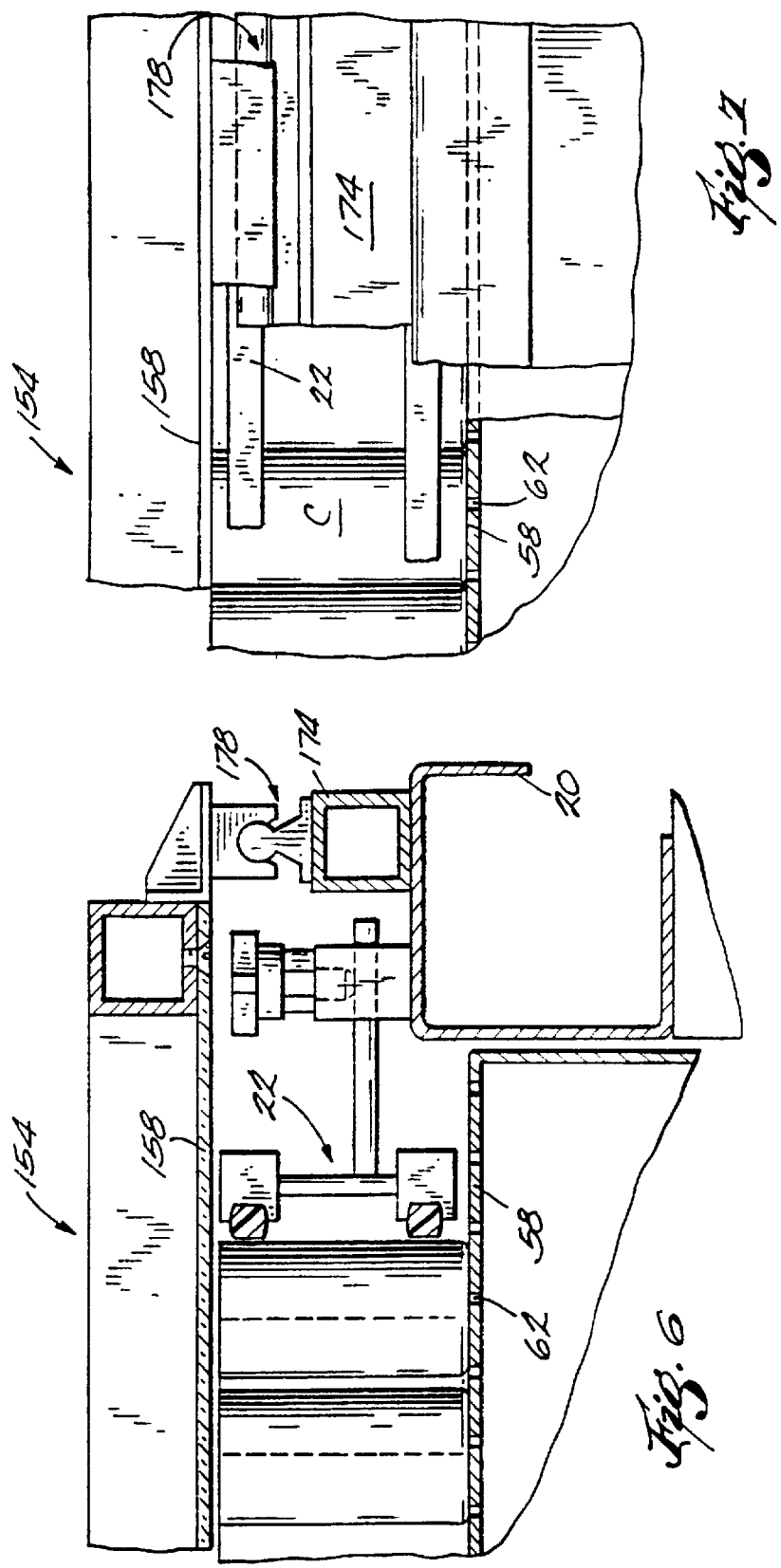

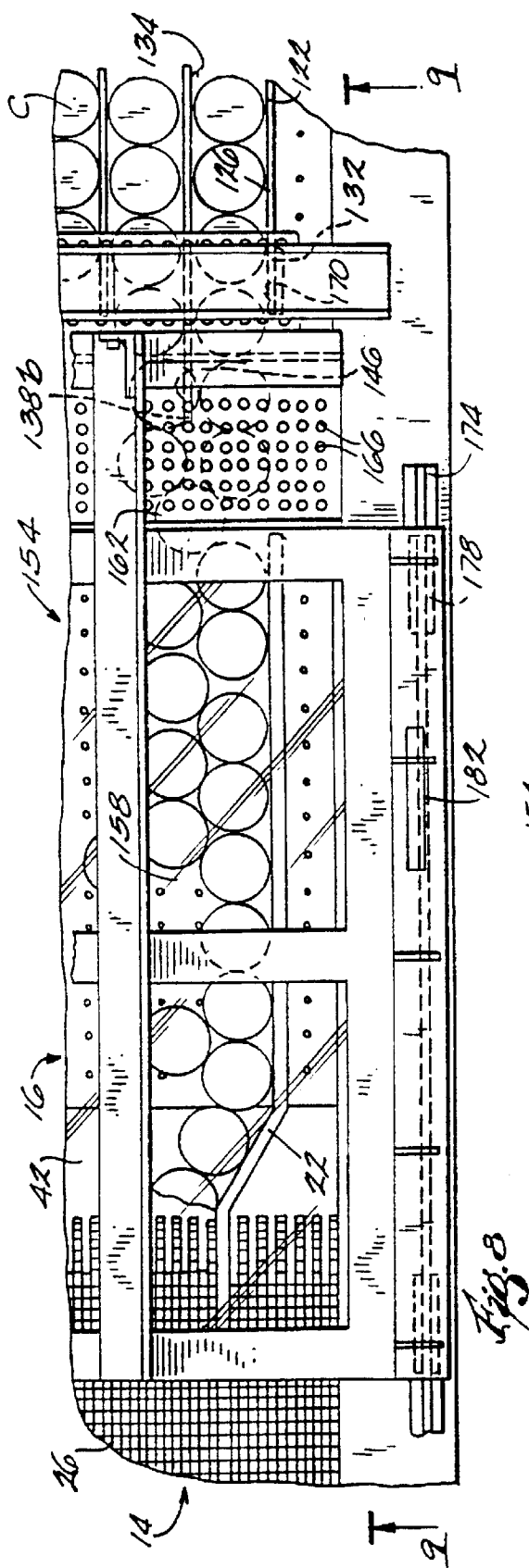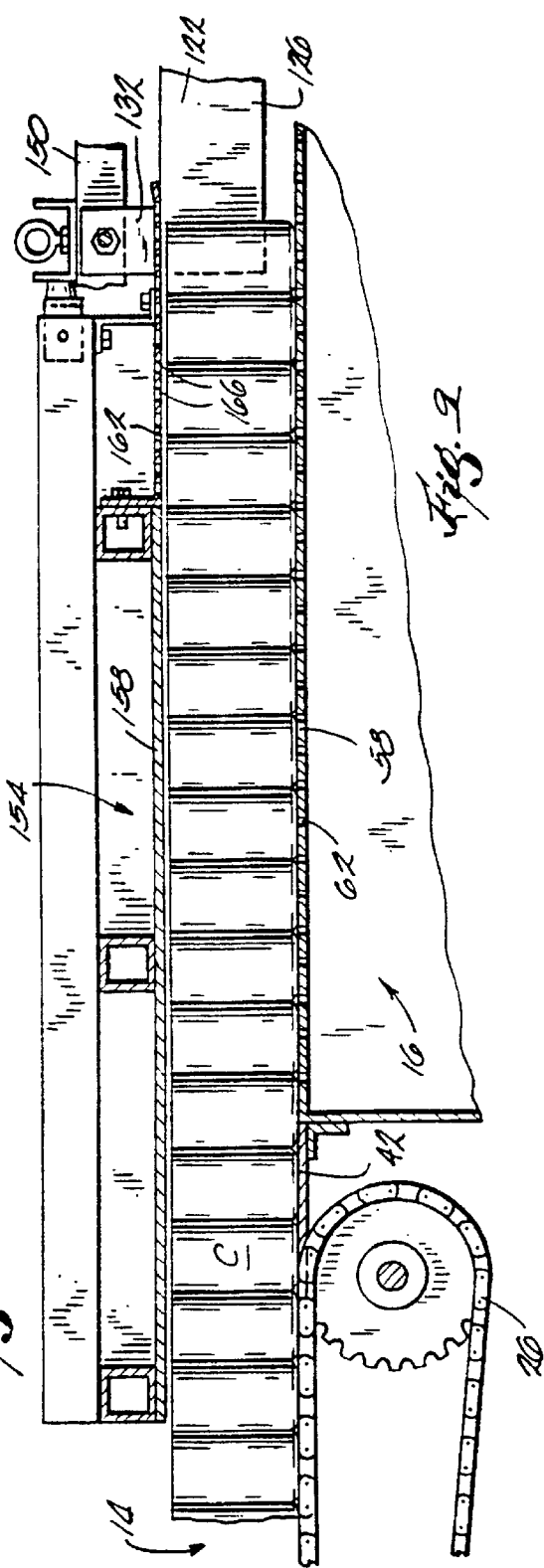

CONTAINER HANDLING SYSTEM

This appln is a 371 of PCT/US98/20568 filed Oct. 1, 1998 which claims benefit of 60/060,832 filed Oct. 1, 1997.

BACKGROUND OF THE INVENTION

1. Technical Field

The invention relates to apparatus for palletizing containers and, more particularly, to apparatus for palletizing circular containers arranged in a honeycomb pattern. The invention also relates to apparatus for arranging circular containers in a honeycomb pattern.

2. Related Prior Art

Empty containers, and typically 12 ounce beverage cans, are generally transported to canners or bottlers on pallets. Individual layers of cans on pallets are commonly arranged in a honeycomb pattern, i.e., in nested, parallel rows with the containers of alternate rows being offset one container radius relative to the containers of the remaining rows. Cans are usually patterned on the palletizer conveyor. Various methods and apparatus are known for arranging cans in a honeycomb pattern on a conveyor. See, for example, U.S. Pat. No. 2,949,179, issued to Busse on Aug. 16, 1960; and U.S. Pat. No. 4,834,605, issued to Jerred on May 30, 1989. Another known method for arranging cans in a honeycomb pattern is to provide fences or guide rails on opposite sides of the conveyor and then allow cans to "pile up" on the conveyor and form the honeycomb pattern by themselves. This method is known as "self-patterning."

SUMMARY OF THE INVENTION

One problem with some conventional container handling systems is that the systems include only conventional belt conveyors which convey containers at a slower speed than other types of conveyors, such as air bed conveyors.

Another problem with some conventional container handling apparatus is that the use of an air bed conveyor in the pattern forming apparatus, especially while conveying containers through the downstream portion of the pattern forming apparatus and to the sweep apparatus, causes the pattern of containers to be less organized and more easily disrupted.

Yet another problem with some conventional container handling systems is that the top cover is not easily movable so that the air bed conveyor and the portion of the pattern forming apparatus under the top cover are not readily accessible to correct any malfunctions or blockages.

A further problem with some conventional container handling systems is that the top cover does not includes any aligning mechanism to ensure that the top cover is properly positioned during conveying operations.

Another problem with some conventional container handling systems is that top cover assembly does not include the multiple flow configuration, limiting the performance of the air bed conveyor and the portion of the pattern forming apparatus positioned under the top cover assembly.

The invention provides an apparatus for forming generally circular containers into a honeycomb pattern. The pattern forming apparatus includes a plurality of spaced partitions extending generally in the direction of container flow and dividing the upper surface of the conveyor into a plurality of lanes each having a width slightly greater than the diameter of a container. Preferably, the partitions are strips of sheet metal standing on edge and having a height greater than the height of a container. The metal strips are supported above the conveyor upper surface by any suitable means. For example, the strips can be suspended from a frame extending over the conveyor upper surface.

The partitions direct the containers as they are conveyed so that containers nest against previously formed rows to form successive rows of containers. The pattern forming apparatus actually "places" a container in each position of a honeycomb pattern, so that a voidless pattern is obtained.

In one embodiment, the invention provides container handling system comprising a fluid conveyor, a belt conveyor adjacent the fluid conveyor, and a pattern forming apparatus including a first partition and a second partition defining therebetween a lane. The lane has an inlet positioned over the fluid conveyor and an outlet positioned over the belt conveyor. The fluid conveyor conveys the containers into the inlet of the lane and to the belt conveyor. The belt conveyor conveys the containers from the outlet of the lane.

Preferably, the first partition includes a straight portion and an angled portion, and the angled portion is positioned over the belt conveyor. Further, a substantial portion of the straight portion is positioned over the belt conveyor. In other words, the first and second partitions are configured so that the lane has a straight portion and an angled portion, and the angled portion and a substantial portion of the straight portion of the lane are positioned over the belt conveyor.

In another embodiment, the invention provides a container handling system including a first belt conveyor, an air bed conveyor adjacent the first belt conveyor, and a second belt conveyor adjacent the air bed conveyor. The first belt conveyor conveys the containers to the air bed conveyor, the air bed conveyor conveys the containers to the second belt conveyor, and the second belt conveyor conveys the containers to the outlet of the second belt conveyor.

In yet another embodiment, the invention provides a container handling apparatus including an air bed conveyor, and a top cover selectively positionable over the air bed conveyor. The top cover is movable along said direction of flow of the containers between a covered position, in which the air bed conveyor is covered, and an uncovered position. Preferably, the top cover is slidable in a direction opposite to the direction of flow from the covered position to the uncovered position. Also, the container handling system further includes a support assembly for movably supporting the top cover. The support assembly includes first and second support rails oriented generally parallel to said direction of flow, and first and second bearing members respectively supported on the lateral edges of the top cover. The bearing members movably engage the support rails.

In a further embodiment, the invention provides an alignment mechanism for aligning the top cover relative to the pattern forming apparatus when the top cover is positioned over the air bed conveyor. Preferably, the alignment mechanism includes a slot defined in the top cover, and an alignment member supported on the pattern forming apparatus and positionable in the slot to align the top cover relative to the pattern forming apparatus. Also, the top cover preferably includes a solid portion and a perforated portion allowing air from the air bed conveyor to flow therethrough. The slot is defined in the perforated portion of the top cover.

One advantage of the present invention is that the use of the air bed conveyor to move containers to the pattern forming apparatus and through the upstream portion of the pattern forming apparatus takes advantage of the high speed of the air bed conveyor.

Another advantage of the present invention is that the use of a belt conveyor downstream of the air bed conveyor to convey the containers through the downstream portion of the pattern forming apparatus and to the sweep apparatus enables the pattern of containers to be better formed and maintained.

Yet another advantage of the present invention is that the top cover assembly is easily movable so that air bed conveyor and the portion of the pattern forming apparatus under the top cover are readily accessible. As a result, any malfunctions or blockages can be easily corrected and operations resumed quickly.

A further advantage of the present invention is that the top cover assembly an alignment mechanism to cooperate with the pattern forming apparatus to ensure that the top cover is properly positioned during conveying operations.

Another advantage of the present invention is that the multiple flow configuration through the top cover assembly provides increased performance of the air bed conveyor and the portion of the pattern forming apparatus positioned under the top cover assembly.

Other features and advantages of the invention will become apparent to those skilled in the art upon review of the following detailed description, claims and drawings.

DESCRIPTION OF THE DRAWINGS

FIG. 6 is an expanded view of a portion of the container handling system shown in FIG. 5.

FIG. 7 is a side view of the portion of the container handling system shown in FIG. 6 with portions cut away.

FIG. 8 is a top view of a portion of the container handling system shown in FIG. 1.

FIG. 9 is a view taken generally along line 9—9 in FIG. 8.

Figure 1:
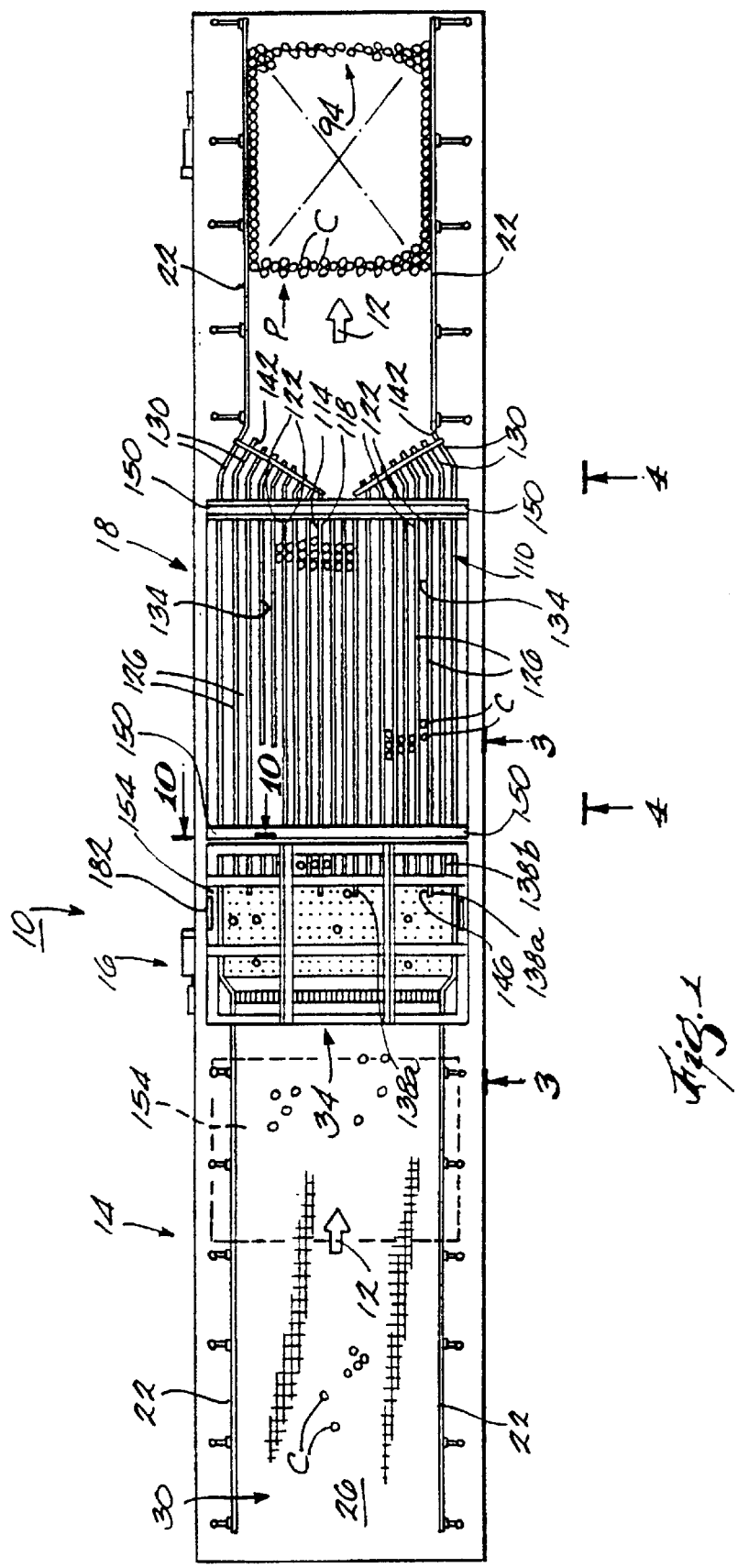
FIG. 1 is a top view of a container handling system embodying the present invention.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE PREFERRED EMBODIMENT

A container handling system embodying the invention is partially illustrated in the drawings. The system palletizes layers of generally circular objects, preferably 12-ounce beverage cans. However, it should be understood that the invention has other uses besides palletizing and is applicable to other objects and to other sizes and types of containers. For example, the system of the present invention could be used to pattern plastic containers or cans of other sizes.

The container handling system includes (see FIGS. 1 and 2) a conveyor assembly 10 having a longitudinal axis and a generally horizontal upper surface. The conveyor assembly 10 receives a stream of containers C en masse from a metering conveyor (not shown), arranges the containers C into a voidless pattern, and transfers the patterned containers C to a palletizer (not shown). The conveyor assembly 10 includes a first or upstream belt conveyor 14, a fluid conveyor, such as air bed conveyor 16, and a second or downstream belt conveyor 18. A frame 20 supports the conveyors 14, 16 and 18. Generally parallel outer guide rails 22 form side walls for the conveyors 14, 16 and 18. The guide rails 22 are adjustably supported by the frame 20 so that the width of the conveyors 14, 16 and 18 is adjustable.

The upstream belt conveyor 14 includes (see FIGS. 1–3) a conveyor belt 26 having an upstream or inlet end 30 and a downstream or outlet end 34. In this section, containers C are conveyed in the direction of flow 12 from the inlet end 30 to the outlet end 34 in an unorganized and unpatterned arrangement.

Figure 3:
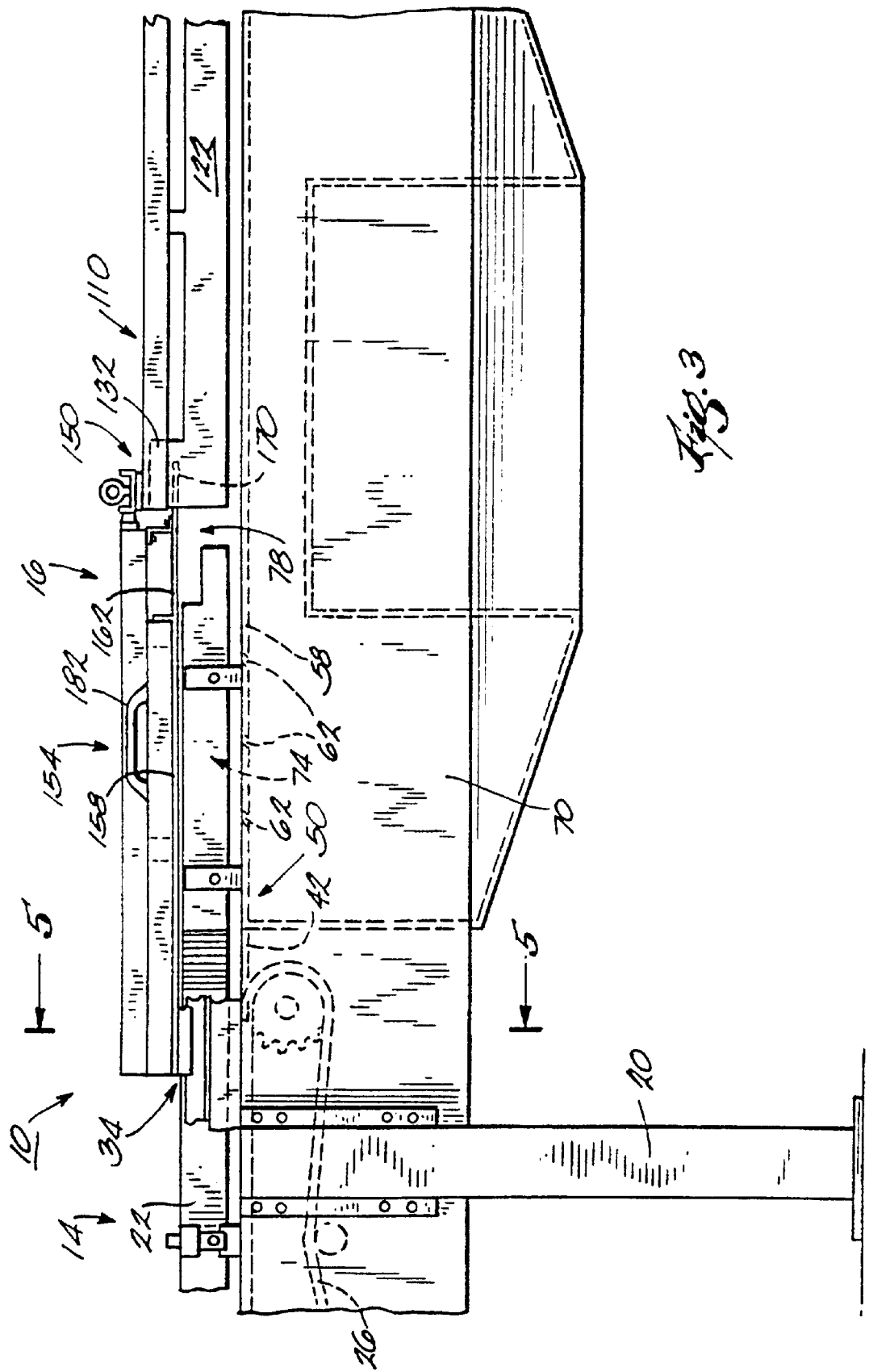
FIG. 3 is a view taken generally along line 3—3 in FIG. 1.

As shown in FIG. 3, at the outlet end 34 of the upstream conveyor 14, a transfer plate 42 is positioned to receive containers C from the upstream conveyor belt 26. The containers C are forced across the transfer plate 42 to the air bed conveyor 16 by the back pressure of the containers C traveling from the upstream conveyor belt 26.

The air bed conveyor 16 includes (see FIGS. 2–4) an upstream or inlet end 50 downstream of the transfer plate 42 and a downstream or outlet end 54. The containers C are accelerated from the transfer plate 42 through the air bed conveyor 16 in the downstream direction of flow 12 in a manner discussed below.

Figure 4:
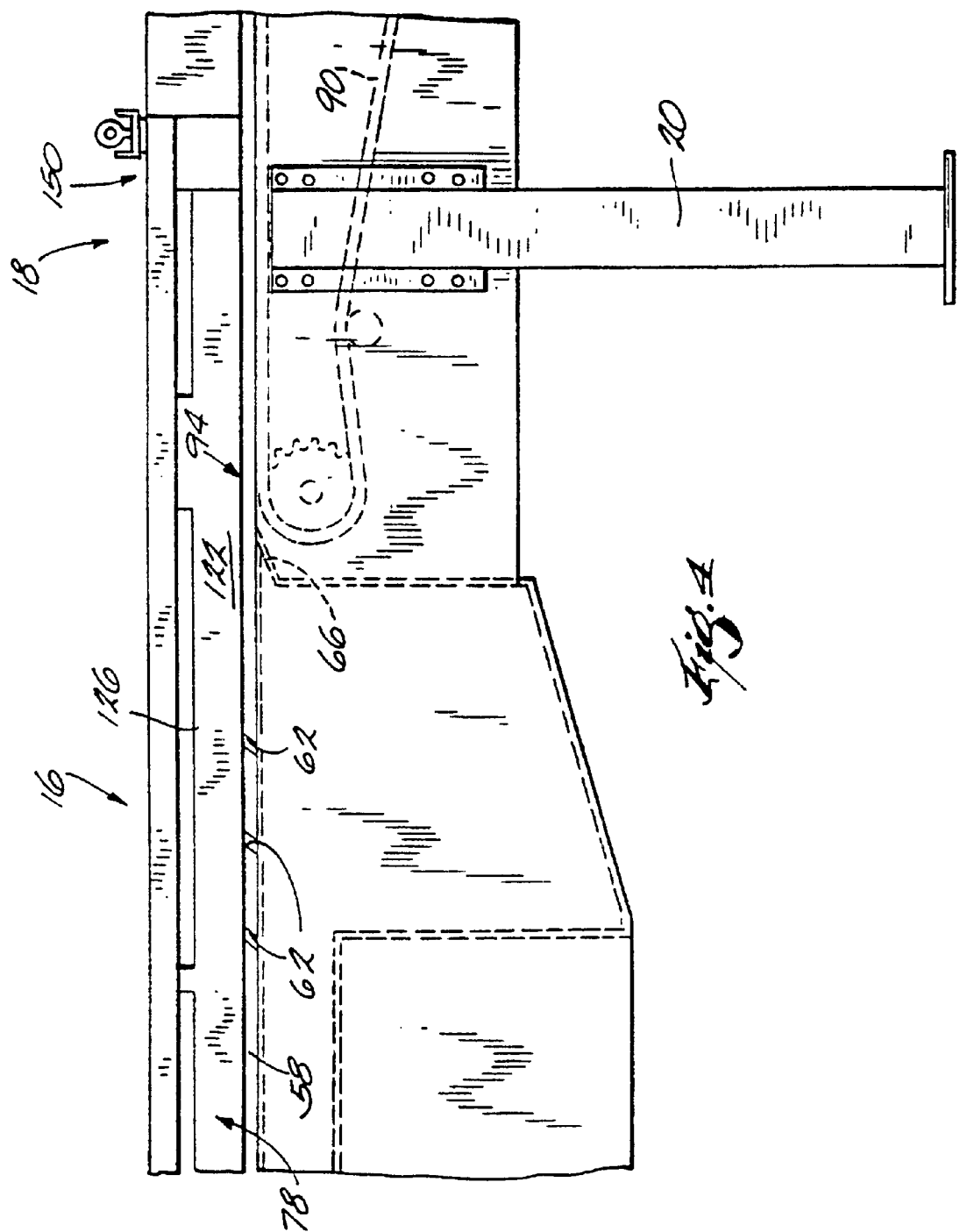
FIG. 4 is a view taken generally along line 4—4 in FIG. 1.
Figure 5:
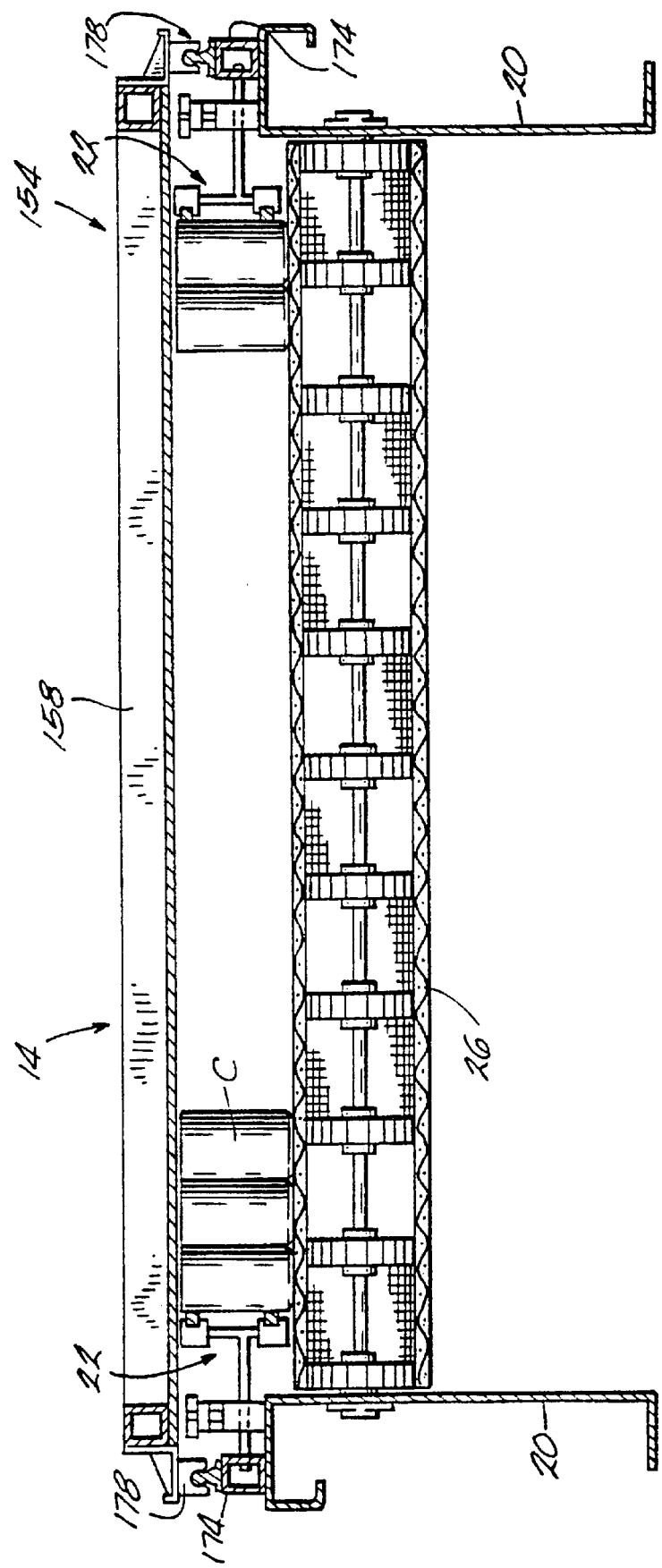
FIG. 5 is a view taken generally along line 5—5 in FIG. 3.
Figure 11:
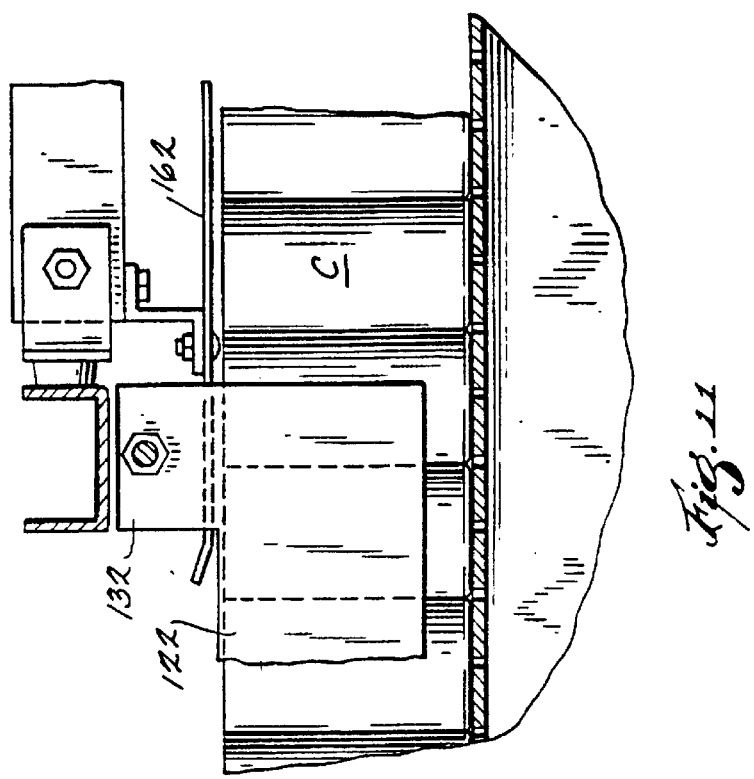
FIG. 11 is a view taken generally along line 11—11 in FIG. 10.
Figure 10:
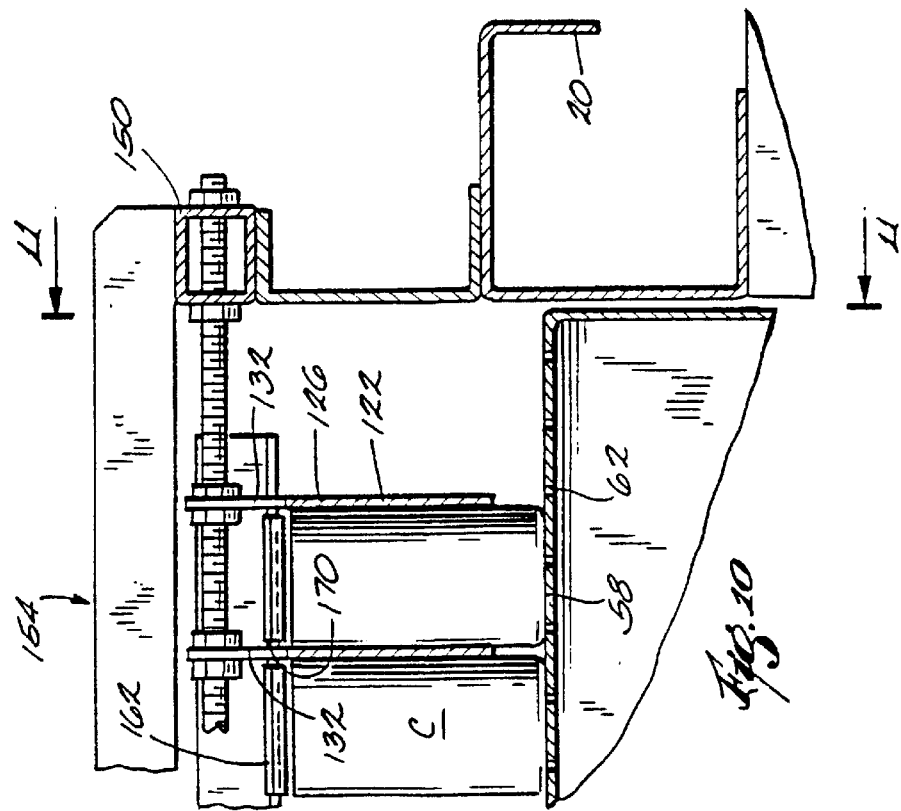
FIG. 10 is a view taken generally along line 10—10 in FIG. 1.

The air bed conveyor 16 includes (see FIGS. 3–4) a base plate 58 having a plurality of apertures 62 formed therein. The apertures 62 extend through the base plate 58 to permit the passage of fluid, such as pressurized air, therethrough. As shown in FIG. 4, the thickness of the base plate 58 narrows to an edge 66 near the outlet end 54 of the air bed conveyor 16.

The air bed conveyor 16 also includes (see FIGS. 2–4) a plenum 70 located beneath the base plate 58. The plenum 70 communicates with a source of pressurized fluid or air for supplying the fluid or air through the apertures 62 in the base plate 58 to convey containers C through the air bed conveyor section 16. As described more fully below, the air bed conveyor 16 includes a high pressure section 74 near the inlet end 50 of the air bed conveyor 16 section and a lower pressure section 78 downstream from the high pressure section 74.

The downstream belt conveyor 18 includes (see FIGS. 2 and 4) a conveyor belt 90 having an upstream or inlet end 94 located downstream of the outlet end 58 of the air bed conveyor 16 and having a downstream or outlet end 98.

As described more fully below (see FIG. 1), as the containers C pass along the downstream belt conveyor 18, the containers C are formed into a pattern P and transferred by the downstream conveyor belt 90 to the palletizer apparatus (not shown).

The palletizer apparatus receives a pattern P of containers C from the conveyor assembly 10. The palletizer apparatus includes means (not shown) for moving a layer of patterned containers C onto a pallet (not shown) or onto a separator sheet (not shown) placed on top of a previously deposited layer (not shown) of containers C. The palletizer apparatus also includes an elevator or hoist (not shown) for lowering the pallet so that the top of the pallet or the top of the previously deposited layer of containers C is even with the upper surface of the belt conveyor 90. This arrangement is known in the art and will not be described in greater detail. It should be understood, however, that other palletizer apparatus can be employed.

The container handling system also includes (see FIGS. 1 and 8–11) a pattern forming apparatus 110. The pattern forming apparatus 110 can be in the form of that disclosed in U.S. Pat. No. 4,834,605, which issued to Jerred and which is hereby incorporated by reference.

Generally, the pattern forming apparatus 110 includes (see FIG. 1) a pair of center partitions 114 extending generally parallel to the direction of flow 12 and forming a single-file center lane 118 therebetween. The pattern forming apparatus 110 also includes a plurality of outer partitions 122 each having a straight upstream portion 126 which extends generally parallel to the direction of flow 12 and an angled downstream portion 130 which extends at an angle inwardly toward the center lane 118. The angled downstream portions 130 of the outer partitions 122 may be arcuate or may be straight. Aligning members 132 (see FIGS. 8–11) are supported on each of the partitions 114 and 122, for the reasons described below.

As shown in FIG. 1, single-file outer lanes 134 are formed between adjacent outer partitions 122 and between an outer partition 122 and an adjacent center partition 114. The single-file lanes 118 and 134 can only accommodate containers C in a single file.

Each partition 114 and 122 has an upstream end 138 and a downstream end 142. A number of the upstream ends 138a extend further upstream than adjacent upstream ends 138b. Multiple-file lanes 146, capable of accommodating containers C in multiple files positioned laterally, are formed between adjacent upstream ends 138a.

The pattern forming apparatus 110 includes (see FIGS. 1 and 8–11) a support member 150 which is removably supported by the frame 20. In this manner, the pattern forming apparatus 110 may be substituted with another pattern forming apparatus (not shown) having a different partition and/or lane configuration.

Figure 2:
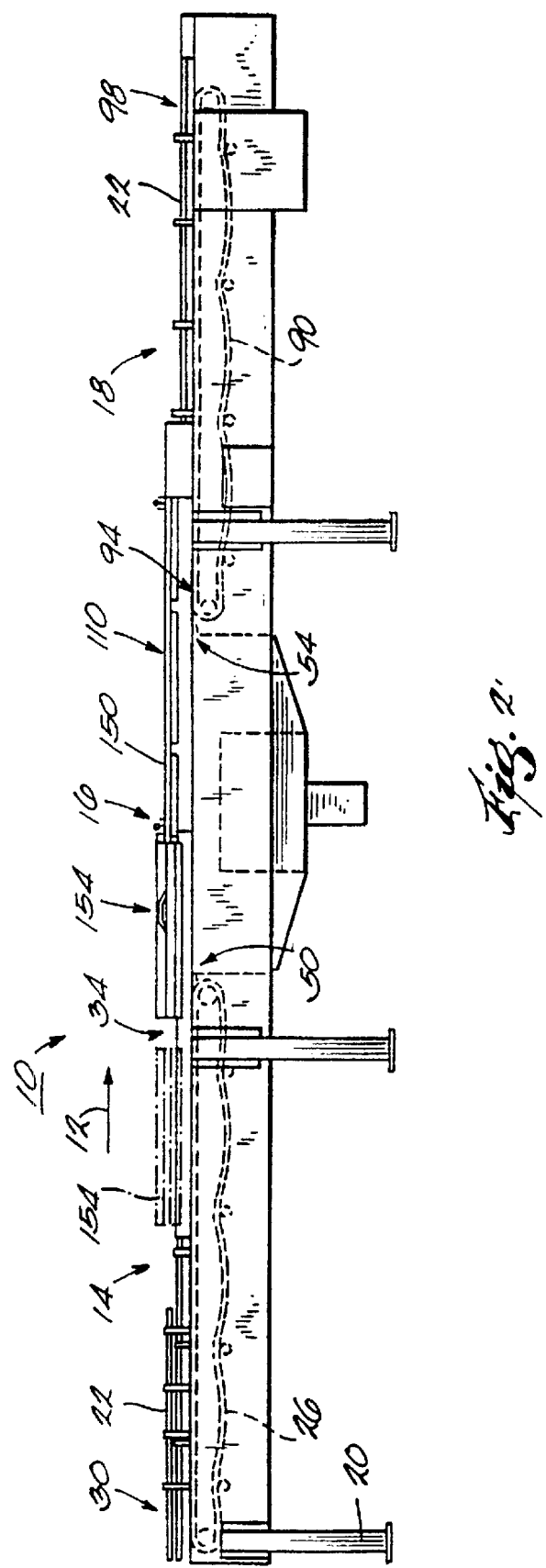
FIG. 2 is a side view of the container handling system shown in FIG. 1.

As shown in FIGS. 1, 2 and 4, a hybrid-type conveyor configuration is provided under the pattern forming apparatus 110 including both the air bed conveyor 16 and the downstream belt conveyor 18. The pattern forming apparatus 110 is positioned so that the upstream ends 138 of the partitions 114 and 122 are positioned over a portion of the air bed conveyor 16 with the multiple-file lanes 146 and an upstream portion of the single-file lanes 118 and 134 over the air bed conveyor 16.

Also, the pattern forming apparatus 110 is positioned so that the remaining downstream portion of the single-file lanes 118 and 134 are positioned over the conveyor belt 90 of the downstream belt conveyor 18. A substantial portion of the straight upstream portion 126 of the outer partitions 122 extend into the downstream belt conveyor 18 section, and the downstream portions 130 are positioned in the downstream belt conveyor 18 section over the conveyor belt 90.

As shown in FIG. 1, containers C flow through the pattern forming apparatus 110 as follows: the containers C flowing from the inlet end 50 of the air bed conveyor 16 flow into the multiple-file lanes 146. The containers C are then conveyed by the air bed conveyor 16 into the single-file lanes 118 and 134. At this point, containers C flow between the straight upstream portions 126 of the outer partitions 122.

The containers C pass through the straight upstream portions 126 and through the lanes 118 and 134 and are transferred to the downstream belt conveyor 18. The containers C are conveyed by the conveyor belt 90 through the remainder of the straight portion of the lanes 118 and 134. The conveyor belt 90 then conveys the containers C through the angled downstream portions 130 of the outer partitions 122. As described in U.S. Pat. No. 4,834,605, a nested voidless pattern P is formed at the outlet of the pattern forming apparatus 110. The conveyor belt 90 conveys the containers C to a sweep apparatus 152 and maintains the containers C in the pattern P as the containers C are conveyed.

The conveyor assembly 10 also includes (see FIGS. 1–3 and 5–11) a top cover assembly 154. The top cover assembly 154 includes (see FIGS. 8 and 9) a top cover 156 having a solid portion 158 and a perforated portion 162. The perforated portion 162 is supported on the downstream end of the solid portion 158 and has apertures 166 extending therethrough to allow the passage of some of the air flowing from the air bed conveyor 16 to pass through the top cover 156. As explained below, the air flow configuration provided by the solid portion 158 and the perforated portion 162 improves the flow of containers C through the air bed conveyor 16. Longitudinal slots 170 (see FIGS. 8 and 10) are formed in the downstream end of the perforated portion 162. These slots 170 accommodate the vertical aligning members 132 supported on and extending above the partitions 114 and 122 of the pattern forming apparatus 110.

The top cover 156 is movable between a first or closed position (shown in solid lines in FIGS. 1 and 2) and a second or open position (shown in phantom lines in FIGS. 1 and 2). The top cover 156 is preferably axially slidable between the first and second positions. To accommodate sliding of the top cover 156 between the open end and closed positions, the top cover assembly 154 includes (see FIGS. 5–11) a pair of support rails 174 supported on the frame 20 and extending parallel to the direction of flow 12. A plurality of bearing assemblies 178 are supported on the rails 174 and support opposite lateral sides of the solid portion 158 of the top cover 156. The bearings 178 roll along the support rails 174 to afford movement of the top cover 156 between the first and second positions. The top cover assembly 154 also includes (see FIGS. 1–3) an operator's handle 182 for use in moving the top cover 156 between the first and second positions.

When the top cover assembly 154 is in the first or closed position, the top cover 156 extends over a portion of the downstream end 34 of the upstream belt conveyor 14. The top cover 156 also extends over the transfer plate 42 and a portion of the upstream end 50 of the air bed conveyor 16. In this position, the solid portion 158 of the top cover 156 is positioned over the high pressure section 74 of the air bed conveyor 16. In this area, containers C are moved at a high speed downstream toward the lower pressure section 78 of the air bed conveyor 16.

When the top cover assembly 154 is in the first position, the perforated section 162 of the top cover assembly 154 extends over a portion of the upstream ends 138 of the partitions 114 and 122 of the pattern forming apparatus 110. The slots 170 formed in the downstream end of the perforated portion 162 are interengaged with the aligning members 132 supported on the partitions 114 and 122.

When the top cover assembly 154 is in the second position, the top cover 156 is moved in an upstream direction opposite the direction of flow 12 on rails 174. The top cover 156 is moved so that the previously covered portions of the air bed conveyor 16 and pattern forming apparatus 110 are uncovered. In the second position, any containers C in the now uncovered section are accessible to correct any malfunction, such as a tipped or blocked container C.

Various other features of the invention are set forth in the following claims.

What is claimed is:

1. A container handling system comprising:

a fluid conveyor having an inlet and an outlet;

a belt conveyor having an inlet adjacent said outlet of said fluid conveyor and an outlet; and a pattern forming apparatus including a first partition and a second partition defining therebetween a lane, said lane having an inlet positioned over said fluid conveyor and an outlet positioned over said belt conveyor; and wherein containers are received at said inlet of said fluid conveyor, wherein said fluid conveyor conveys the containers into said inlet of said lane and to said inlet of said belt conveyor, wherein said belt conveyor conveys the containers from said outlet of said lane.

2. The container handling system as set forth in claim 1 wherein said first partition includes a straight portion and an angled portion oriented at an angle relative to said straight portion, and wherein said angled portion is positioned over said belt conveyor.

3. The container handling system as set forth in claim 2 wherein a portion of said straight portion is positioned over said belt conveyor.

4. The container handling system as set forth in claim 1 wherein said first partition and said second partition are configured so that said lane has a straight portion and an angled portion oriented at an angle relative to said straight portion, and wherein said angled portion of said lane is positioned over said belt conveyor.

5. The container handling system as set forth in claim 4 wherein a portion of said straight portion of said lane is positioned over said belt conveyor.

6. The container handling system set forth in claim 1 and further comprising a top cover assembly positionable over said fluid conveyor and over a portion of said pattern forming apparatus.

7. The container handling system as set forth in claim 6 and further comprising an alignment mechanism for aligning said top cover assembly relative to said pattern forming apparatus.

8. The container handling system as set forth in claim 7 wherein said alignment mechanism includes a longitudinal slot defined in said top cover assembly, and an alignment member supported by said first partition, and wherein said alignment member is positionable in said slot to align said top cover assembly relative to said pattern forming apparatus.

9. A container handling apparatus comprising:

a first belt conveyor having an inlet and an outlet;

an air bed conveyor having an inlet adjacent said outlet of said first belt conveyor and an outlet;

a second belt conveyor having an inlet adjacent said outlet of said air bed conveyor and an outlet;

an apparatus for forming the containers into a pattern, said pattern forming apparatus having an inlet positioned over said air bed conveyor and an outlet positioned over said second belt conveyor; and wherein the containers are received at said inlet of said first belt conveyor, wherein said first belt conveyor conveys the containers to said air bed conveyor, wherein said air bed conveyor conveys the containers to said second belt conveyor, and wherein said second belt conveyor conveys the containers to said outlet of said second belt conveyor.

10. The container handling apparatus as set forth in claim 9 wherein said pattern forming apparatus further includes a downstream portion positioned over said second belt conveyor, wherein the containers are conveyed by said second belt conveyor through said downstream portion of said pattern forming apparatus and from said outlet of said pattern forming apparatus into the pattern, and wherein said second belt conveyor conveys the containers in the pattern to said outlet of said second belt conveyor.

11. The container handling apparatus as set forth in claim 9 further comprising a top cover assembly positionable over said air bed conveyor.

12. A container handling apparatus comprising:

an air bed conveyor for conveying containers in a direction of flow; and a top cover selectively positionable over said air bed conveyor, said top cover being movable along said direction of flow between a covered position, in which said air bed conveyor is covered, and an uncovered position.

13. The container handling apparatus as set forth in claim 12 wherein said top cover is movable in a direction opposite to said direction of flow from said covered position to said uncovered position.

14. The container handling apparatus as set forth in claim 12 wherein said top cover is slidable between said covered position and said uncovered position.

15. The container handling apparatus as set forth in claim 12 wherein said top cover has opposite first and second lateral edges, wherein said container handling further comprises:

a frame supporting said air bed conveyor; and a support assembly for movably supporting said top cover, said support assembly including first and second support rails supported by said frame and oriented generally parallel to said direction of flow, and first and second bearing members respectively supported on said first and second lateral edges of said top cover, said first and second bearing members movably engaging said first and second support rails, respectively.

16. A container handling system comprising:

an air bed conveyor for conveying containers in a direction of flow;

an apparatus for forming the containers into a pattern, said pattern forming apparatus including an upstream portion positioned over said air bed conveyor;

a top cover positionable over said air bed conveyor and over at least said upstream portion of said pattern forming apparatus; and an alignment mechanism for aligning said top cover relative to said pattern forming apparatus when said top cover is positioned over said air bed conveyor.

17. The container handling system as set forth in claim 16 wherein said alignment mechanism includes a slot defined in said top cover, and an alignment member supported on said pattern forming apparatus, and wherein said alignment member is positionable in said slot to align said top cover relative to said pattern forming apparatus.

18. The container handling system as set forth in claim 17 wherein said top cover is movable along said direction of flow between a covered position, in which said air bed conveyor and said at least said upstream portion of said pattern forming apparatus are covered, and an uncovered position, and wherein, as said top cover is moved from said uncovered position to said covered position, said aligning member engages said slot to align said top cover.

19. The container handling system as set forth in claim 17 wherein said top cover includes a solid portion and a perforated portion allowing air from said air bed conveyor to flow therethrough, and wherein said slot is defined in said perforated portion of said top cover.

20. A container handling system comprising:
- an air bed conveyor for conveying containers in a direction of flow; and
- a top cover positionable over said air bed conveyor, said top cover including a solid portion and a perforated portion allowing air from said air bed conveyor to flow therethrough, said top cover being movable relative to said air bed conveyor.

* * * * *

UNITED STATES PATENT AND TRADEMARK OFFICE
CERTIFICATE OF CORRECTION

PATENT NO. : 6,398,461 B1
DATED : June 4, 2002
INVENTOR(S) : Patris E. Vincent et al.

It is certified that error appears in the above-identified patent and that said Letters Patent is hereby corrected as shown below:

Column 8,
Line 36, insert the word -- apparatus -- after the word "handling"

Signed and Sealed this

Nineteenth Day of August, 2003

JAMES E. ROGAN
*Director of the United States Patent and Trademark Office*